US011138891B2

(12) United States Patent
Roger et al.

(10) Patent No.: US 11,138,891 B2
(45) Date of Patent: Oct. 5, 2021

(54) METHOD AND ELECTRONIC SYSTEM FOR MANAGING THE FLIGHT OF AN AIRCRAFT IN A VISUAL APPROACH PHASE TO A RUNWAY, RELATED COMPUTER PROGRAM

(71) Applicant: THALES, Courbevoie (FR)

(72) Inventors: Michel Roger, Toulouse (FR); Valérie Bataillon, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/921,242

(22) Filed: Jul. 6, 2020

(65) Prior Publication Data

US 2021/0012671 A1 Jan. 14, 2021

(30) Foreign Application Priority Data

Jul. 8, 2019 (FR) ...................................... 19 07585

(51) Int. Cl.
*G01C 21/00* (2006.01)
*G08G 5/02* (2006.01)

(52) U.S. Cl.
CPC .................................... *G08G 5/025* (2013.01)

(58) Field of Classification Search
None
See application file for complete search history.

(56) References Cited

U.S. PATENT DOCUMENTS 7,690,603 B2 * 4/2010 Peyrucain ............... G01S 19/48 244/183
8,032,267 B1 * 10/2011 Simon .................. G01C 23/005 701/4
8,112,188 B2 * 2/2012 Rouquette ............ G05D 1/0676 701/16
2014/0350755 A1 11/2014 Caillaud et al.
2015/0081197 A1 * 3/2015 Gaertner .............. G08G 5/0021 701/120
2018/0281988 A1 * 10/2018 Tellechea ............... G08G 5/025

FOREIGN PATENT DOCUMENTS

CN 103699132 A 4/2014

OTHER PUBLICATIONS

French Search Report, from the French Patent Office in counterpart French Application No. 1907585, dated Apr. 17, 2020.

* cited by examiner

*Primary Examiner* — Brent Swarthout
(74) *Attorney, Agent, or Firm* — Arent Fox LLP

(57) ABSTRACT

This method for managing the flight of an aircraft in a visual approach phase to a runway is implemented by an electronic flight management system and comprises:

acquiring at least one set among a set of values of lateral visual approach trajectory parameters and a set of values of vertical visual approach trajectory parameters, at least one of said values of visual approach trajectory parameters being able to be designated by a user, computing at least one trajectory among a lateral visual approach trajectory from the values of said lateral visual approach trajectory parameters and a vertical visual approach trajectory from the values of said vertical visual approach trajectory parameters, and generating a visual approach trajectory to the runway from the lateral visual approach trajectory and/or the vertical visual approach trajectory.

13 Claims, 8 Drawing Sheets

[Fig 8]
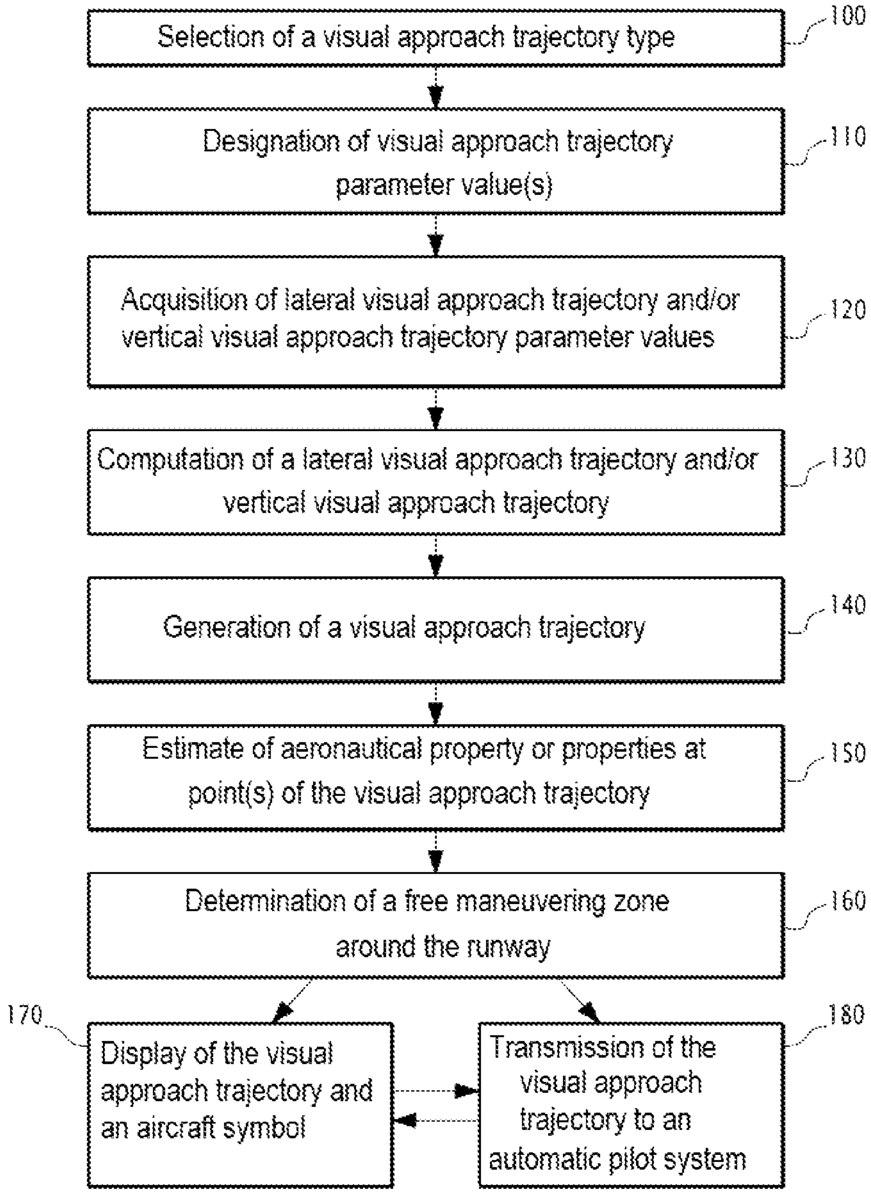

METHOD AND ELECTRONIC SYSTEM FOR MANAGING THE FLIGHT OF AN AIRCRAFT IN A VISUAL APPROACH PHASE TO A RUNWAY, RELATED COMPUTER PROGRAM

CROSS-REFERENCE TO RELATED APPLICATIONS

This application is a U.S. non-provisional application claiming the benefit of French Application No. 19 07585, filed on Jul. 8, 2019, which is incorporated herein by reference in its entirety.

FIELD

The present invention relates to a method for managing the flight of an aircraft in a visual approach phase to a runway, the method being implemented by an electronic flight management system.

The invention also relates to a non-transitory computer-readable medium including a computer program including software instructions which, when executed by a computer, implement such a flight management method.

The invention also relates to an electronic flight management system configured to manage the flight of an aircraft in a visual approach phase to a runway.

The invention then relates to the field of methods and systems to aid the piloting of an aircraft, preferably intended to be embedded in the aircraft.

The invention in particular relates to the management of the flight of an aircraft, in particular in the visual approach phase to a runway.

BACKGROUND

Among the so-called visual approaches, a known maneuver is called Visual with Prescribed Track (VPT), which corresponds to a visual maneuver done at the end of an approach procedure using instruments, this maneuver being done by following a trajectory using visual landmarks. Visual approaches also include a circling maneuver, also denoted MVL, which corresponds to a maneuver done at the end of the approach maneuver using instruments, and for which the pilot has no trajectory to be followed, while nevertheless having to stay within the limits of a protection area associated with the aircraft.

In the case of a visual maneuver with prescribed track VPT, the visual approach trajectory to the runway, which the aircraft must follow, is generally indicated on aeronautical navigation charts, and these charts then typically indicate visual landmarks on the ground for the pilot. The pilot then trusts the landmarks on the ground to guide the aircraft to the runway according to this visual maneuver with imposed track, but the interpretation of these visual landmarks is susceptible to change from one pilot to another, or even from one day to another for a same pilot, creating unpredictable trajectories that are sources of potential accidents.

Also known are flight management systems, also denoted FMS, designed to prepare, and next automatically govern the aircraft based on a trajectory established from a flight plan. In this operating mode, also called managed guide mode, the aircraft is guided by the flight management system and the automatic pilot, also called automatic pilot system, along a three-dimensional trajectory, or 3D trajectory. To build a flight plan and the associated 3D trajectory, the flight management system typically bases itself on a navigation database comprising characteristic elements of air navigation, such as waypoints, navigation beacons, cruising flight procedures (airways), procedures for a departure phase (SID), APP and STAR procedures for an approach phase. In particular, when the pilot selects an approach procedure, the flight management system inserts said approach procedure into the flight plan, this procedure being characterized by a series of segments defined by an endpoint and a way to reach it, said segments coming from the navigation database. Furthermore, the flight management system computes, for each of the waypoints of the flight plan, predictions (or estimates) of the time, altitude, speed and/or fuel remaining at the respective waypoint.

However, for a visual approach, there is no characterization in the navigation database, and the flight management system is then not capable of providing aid to the pilot for the visual approach phase.

Document CN 103 699 132 A then teaches a device and method for assisting the pilot during a visual approach phase, in particular with an unobstructed view, and this assistance device allows the pilot to select, in a database, a type or category of aircraft, a type of visual approach, as well as the airport or runway to which the visual approach phase must be done, and the assistance device next automatically computes a visual approach trajectory to said runway.

However, although it facilitates the visual approach phase for the pilot, such an assistance device can still be improved.

SUMMARY

The aim of the invention is then to propose an associated method and electronic system for managing the flight of an aircraft making it possible to still further facilitate the visual approach phase to a runway for a user, such as the pilot or the copilot of the aircraft, and to then further improve the safety of the flight.

To that end, the invention relates to a method for managing the flight of an aircraft in a visual approach phase to a runway, the method being implemented by an electronic flight management system and comprising the following steps:

- acquiring at least one set among a set of values of lateral visual approach trajectory parameters and a set of values of vertical visual approach trajectory parameters, at least one of said values of visual approach trajectory parameters being able to be designated by a user,

- computing at least one trajectory among a lateral visual approach trajectory from the values of said lateral visual approach trajectory parameters and a vertical visual approach trajectory from the values of said vertical visual approach trajectory parameters, and
- generating a visual approach trajectory to the runway from the lateral visual approach trajectory and/or the vertical visual approach trajectory.

Thus, the flight management method according to the invention allows the user to designate at least one of the values of lateral visual approach trajectory parameters and/or at least one of the values of vertical visual approach trajectory parameters, and thus to adapt, depending on his need, the lateral visual approach trajectory and/or the vertical visual approach trajectory that will next be calculated from the values of said lateral visual approach trajectory parameters and/or of said vertical visual approach trajectory parameters.

A lateral visual approach trajectory parameter refers to a parameter used to compute a form of the lateral visual approach trajectory. Each lateral visual approach trajectory parameter is for example chosen from the group consisting of: the position of an initial point of the approach trajectory, an outbound heading, a length of a segment of the approach trajectory, said segment preferably being rectilinear and substantially parallel to the runway, a turn radius of the aircraft and a turning direction of the aircraft.

A vertical visual approach trajectory parameter refers to a parameter used to compute a form of the vertical visual approach trajectory. Each vertical visual approach trajectory parameter is for example selected from the group consisting of: a minimum altitude of an initial point of descent of the aircraft along a final approach axis to the runway and an angle of the final approach axis relative to a reference plane of the runway, also called final approach slope.

According to other advantageous aspects of the invention, the flight management method comprises one or more of the following features, considered alone or according to all technically possible combinations:

the method further comprises a step for displaying, on a display screen, the visual approach trajectory, the display step preferably further comprising the display of a symbol representative of the position of the aircraft relative to the visual approach trajectory;

the method further comprises a step for transmitting instructions for following the visual approach trajectory to an electronic automatic pilot system;

each lateral visual approach trajectory parameter is chosen from among the group consisting of: the position of an initial point of the approach trajectory, an outbound heading, a length of a segment of the approach trajectory, a turn radius of the aircraft and a turning direction of the aircraft; and each vertical visual approach trajectory parameter is selected from among the group consisting of: a minimum altitude of an initial point of descent along a final approach axis and an angle of the final approach axis relative to a reference plane of the runway;

the method further comprises, prior to the acquisition step, a step for selecting a type among a group of types of visual approach trajectory, each type of visual approach trajectory corresponding to a respective predefined form of the visual approach trajectory, and during the acquisition step, the or each set of values of visual approach trajectory parameters then depending on the selected type, the group of types preferably comprising:

a first type corresponding to a visual approach trajectory comprising a deviation by an outbound heading followed by a segment substantially parallel to the runway and a turn at substantially 180°;

a second type corresponding to a visual approach trajectory comprising a deviation by an outbound heading followed by a segment substantially perpendicular to the runway and a turn at substantially 90°; and a third type corresponding to a visual approach trajectory comprising a deviation by an outbound heading followed by a turn substantially between 90° and 180°, a segment substantially parallel to the runway and a turn at substantially 180°;

the method further comprises a step for determining a maneuvering zone around the runway; and the method further comprises a step for estimating at least one aeronautical variable at least at one point of the visual approach trajectory, each aeronautical variable at a respective point of the visual approach trajectory preferably being chosen from the group consisting of: a distance between said respective point of the visual approach trajectory and another point of the visual approach trajectory, a remaining quantity of fuel, a passage date and a speed of the aircraft.

The invention also relates to a non-transitory computer-readable medium including a computer program including software instructions which, when executed by a computer, implement a flight management method, as defined above.

The invention also relates to an electronic flight management system, the system being configured to manage the flight of an aircraft in the visual approach phase to a runway, and comprising:

an acquisition module configured to acquire at least one set among a set of values of lateral visual approach trajectory parameters and a set of values of vertical visual approach trajectory parameters, a designating module configured to designate, from an interaction with a user, at least one of said values of visual approach trajectory parameters, a computing module configured to compute at least one trajectory among a lateral visual approach trajectory from the values of said lateral visual approach trajectory parameters and a vertical visual approach trajectory from the values of said vertical visual approach trajectory parameters, and a generating module configured to generate a visual approach trajectory to the runway from the lateral visual approach trajectory and/or the vertical visual approach trajectory.

According to another advantageous aspect of the invention, the electronic flight management system comprises one or more of the following features, considered alone or according to all technically possible combinations:

the system further comprises a display module configured to display, on a display screen, the visual approach trajectory, the display module preferably further being configured to display a symbol representative of the position of the aircraft relative to the visual approach trajectory;

the system further comprises a transmission module configured to transmit instructions for following the visual approach trajectory to an electronic automatic pilot system;

the system further comprises a selection module configured to select one type among a group of visual approach trajectory types, each visual approach trajectory type corresponding to a respective predefined form of the visual approach trajectory, and the acquisition module then being configured to acquire the or each set of trajectory parameter values as a function of the selected type;

the system further comprises a determining module configured to determine a maneuvering zone around the runway; and the system further comprises an estimating module configured to estimate at least one aeronautical variable at least at one point of the visual approach trajectory.

BRIEF DESCRIPTION OF THE DRAWINGS

These features and advantages of the invention will appear more clearly upon reading the following description, provided solely as a non-limiting example, and done in reference to the appended drawings, in which:

FIG. 8 is a flowchart of a method, according to the invention, for managing the flight of the aircraft in the visual approach phase to the runway.

DETAILED DESCRIPTION

In the description, the expression “substantially equal to” designates a relationship of equality to within plus or minus 10%, preferably to within plus or minus 5%.

Figure 1:
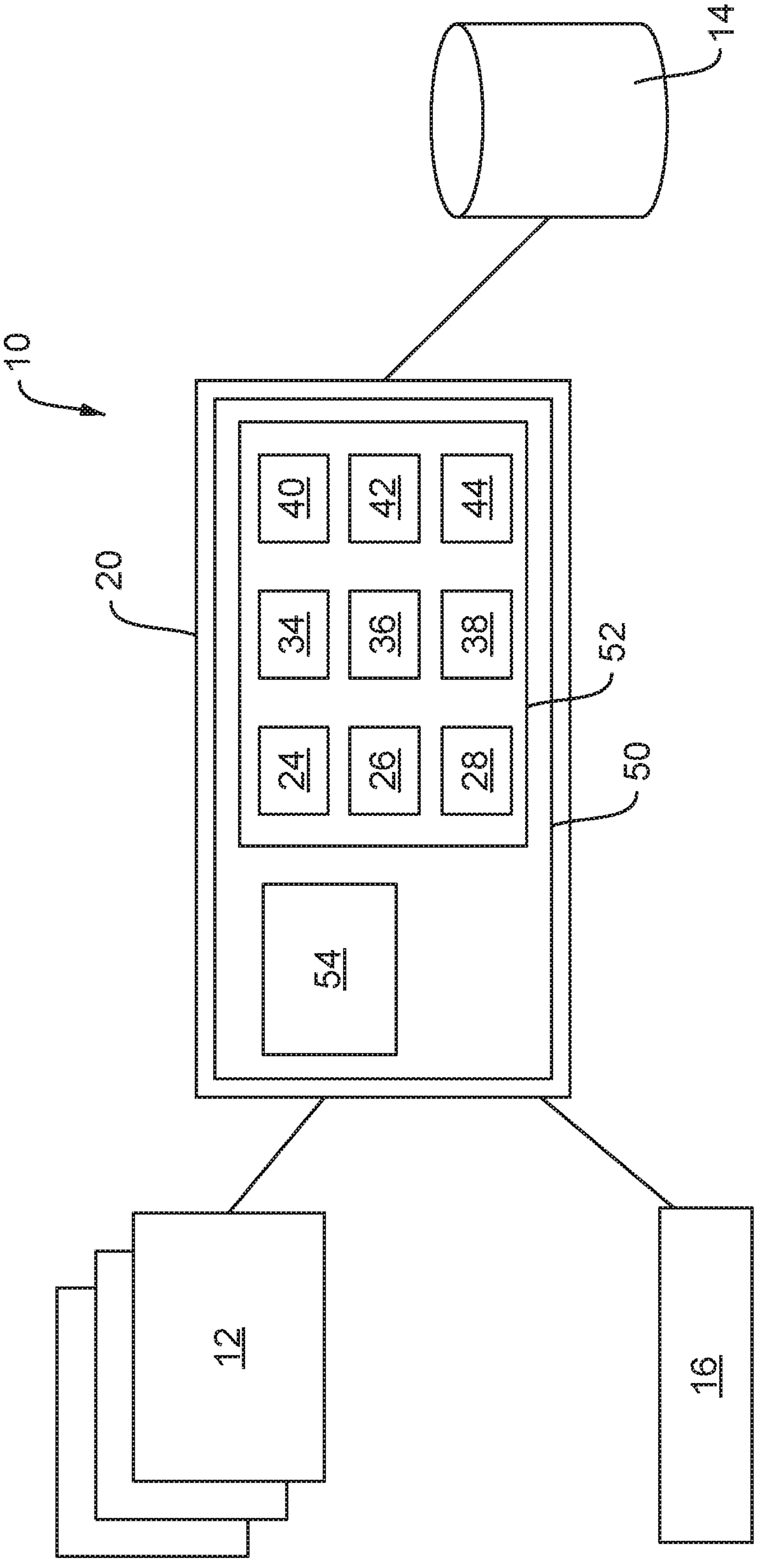
FIG. 1 is a schematic illustration of an aircraft comprising an electronic flight management system according to the invention, connected to avionic systems, to a navigation database, as well as to a display screen.

In FIG. 1, an aircraft 10 comprises several avionics systems 12, a database 14, such as a navigation database, a display screen 16 and a flight management system 20 connected to the avionics systems 12, the database 14 and the display screen 16.

The aircraft 10 is for example an airplane. In a variant, the aircraft 10 is a helicopter, or a drone able to be piloted remotely by a pilot.

Avionics systems 12 are known in themselves and are able to transmit the electronic flight management system 20 different avionic data, for example so-called “aircraft” data, such as the position, the orientation, the heading or the altitude of the aircraft 10, and/or so-called “navigation” data, such as a flight plan. The avionics systems 12 are also able to receive instructions and/or commands from the flight management system 20, one of the avionics systems 12 in particular being an electronic automatic pilot system, also called automatic pilot and denoted AP.

The database 14 is typically a navigation database, and is known in itself. The navigation database is also called NAVDB (NAVigation DataBase), and in particular comprises data relative to each of the runways 22 on which the aircraft 10 may land, these data typically being a position of a threshold of the runway 22, an orientation of the runway 22, a runway length, an altitude or a decision point, etc.

In the example of FIG. 1, the database 14 is a database outside the flight management system 20. In a variant, not shown, the database 14 is a database inside the flight management system 20.

The display screen 16 is known in itself. The display screen 16 is preferably a touchscreen, so as to allow the entry of interaction(s) by a user, not shown, such as the pilot or the copilot of the aircraft 10.

The electronic flight management system 20 is also called FMS, and is configured to manage the flight of the aircraft 10, in particular in the visual approach phase to a respective runway 22.

The electronic flight management system 20 comprises an acquisition module 24 for acquiring at least one set among a set of lateral visual approach trajectory parameter values and a set of vertical visual approach trajectory parameter values, a designating module 26 for designating, from an interaction by the user, at least one of said visual approach trajectory parameter values, a computing module 28 for computing at least one trajectory among a lateral visual approach trajectory 30 (visible in FIG. 3) from values of said lateral trajectory parameters and a vertical visual approach trajectory 32 (visible in FIG. 4) from values of said vertical trajectory parameters, and a generating module 34 for generating a visual approach trajectory to the runway 22 from the lateral visual approach trajectory 30 and/or the vertical visual approach trajectory 32.

As an optional addition, the electronic flight management system 20 comprises a display module 36 for displaying, on the display screen 16, the visual approach trajectory and/or a transmission module 38 for transmitting instructions to follow the visual approach trajectory to a respective avionic system 12, such as the electronic automatic pilot system.

According to this addition, one skilled in the art will understand that the display screen 16 is then able to display the visual approach trajectory, in addition to any entry of interaction(s) by the user when the screen 16 is touch-sensitive. In a variant, not shown, the display screen for the visual approach trajectory and the touch-sensitive screen for the entry of interaction(s) by the user are two separate screens.

As another optional addition, the electronic flight management system 20 comprises a selection module 40 for selecting one type among a group of types of visual approach trajectory, such as the group of first T1, second T2 and third T3 types of visual approach trajectory that will be described as an example hereinafter, the acquisition module 24 then being configured to acquire each set of trajectory parameter values as a function of the selected type.

Also as an optional addition, the electronic flight management system 20 comprises a determining module 42 for determining a maneuvering zone, not shown, around the runway 22 and/or an estimating module 44 for estimating at least one aeronautic variable at least at one point of the visual approach trajectory.

In the example of FIG. 1, the electronic flight management system 20 comprises an information processing unit 50, for example made up of a memory 52 and a processor 54 associated with the memory 52.

In the example of FIG. 1, the acquisition module 24, the designating module 26, the computing module 28 and the generating module 34, as well as, by way of optional addition, the display module 36, the transmission module 38, the selection module 40, the determining module 42 and the estimating module 44, are each made in the form of software, or a software component, executable by the processor 54. The memory 52 of the electronic flight management system 20 is then able to store software for acquiring at least one set among the set of lateral visual approach trajectory parameter values and a set of vertical visual approach trajectory parameter values, software for designating, from the interaction by the user, at least one of said visual approach trajectory parameter values, software for computing at least one trajectory among the lateral visual approach trajectory 30 from values of said lateral trajectory parameters and the vertical visual approach trajectory 32 from values of said vertical trajectory parameters and software for generating the visual approach trajectory to the runway 22 from the lateral visual approach trajectory 30 and/or the vertical visual approach trajectory 32. As an optional addition, the memory 52 of the electronic flight management system 20 is able to store software for displaying the visual approach trajectory on the display screen 16, software for transmitting the avionic system 12 instructions to follow the visual approach trajectory, software for selecting one among the types of visual approach, software for determining the maneuvering zone around the runway 22 and software for estimating at least one respective aeronautic variable at least at one point of the visual approach trajectory. The processor 54 is then able to execute each of the software applications among the acquisition software, the designating software, the computing software and the generating software, as well as, by way of optional addition, the display software, the transmission software, the selection software, the determining software and the estimating software.

When, in a variant that is not shown, the database 14 is a database internal to the flight management system 20, it is typically able to be stored in a memory of the flight management system 20, such as the memory 52.

In a variant that is not shown, the acquisition module 24, the designating module, the computing module 28 and the generating module 34, as well as, by way of optional addition, the display module 36, the transmission module 38, the selection module 40, the determining module 42 and the estimating module 44, are each made in the form of a programmable logic component, such as an FPGA (Field Programmable Gate Array), or in the form of a dedicated integrated circuit, such as an ASIC (Application-Specific Integrated Circuit).

When the electronic flight management system 20 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

Figure 3:
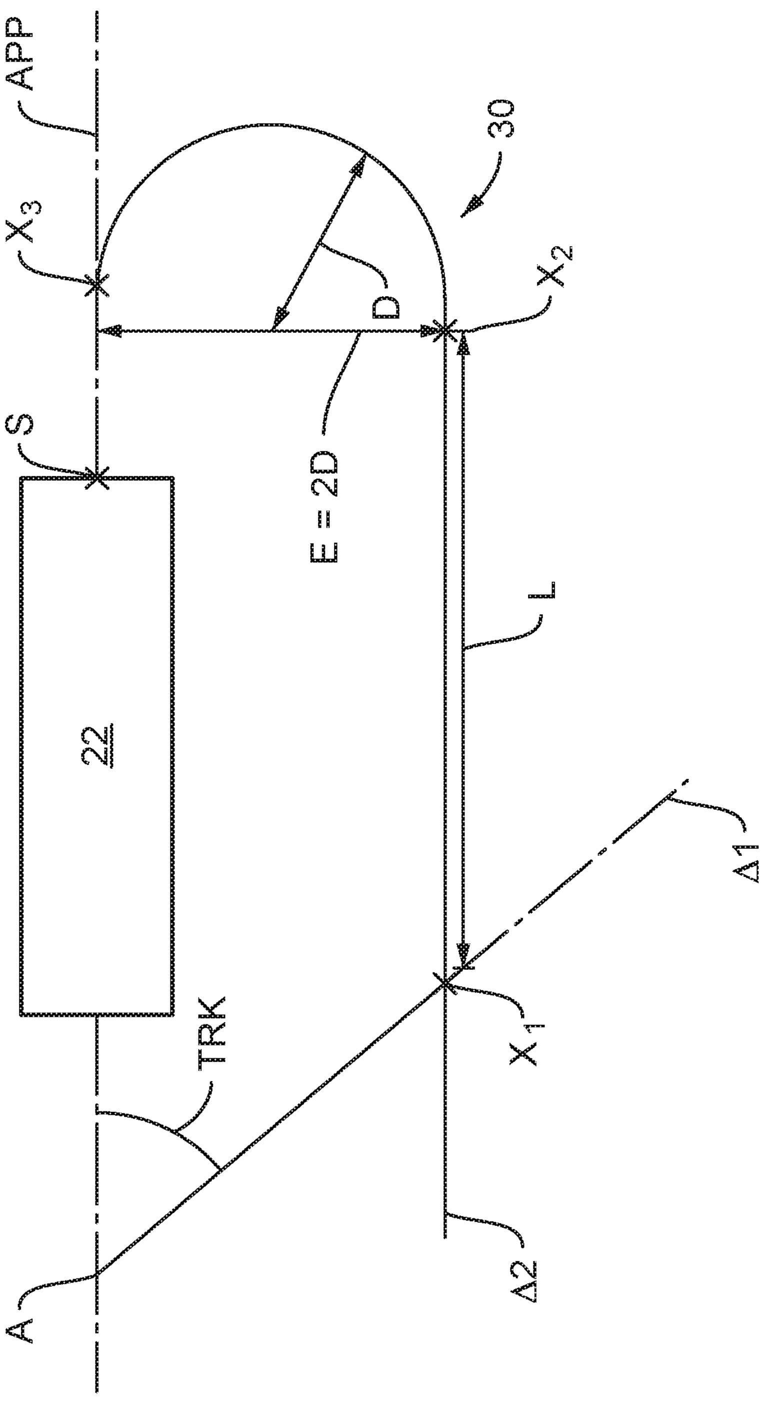
FIG. 3 is a schematic view showing lateral visual approach trajectory parameters used to compute a lateral visual approach trajectory.
Figure 4:
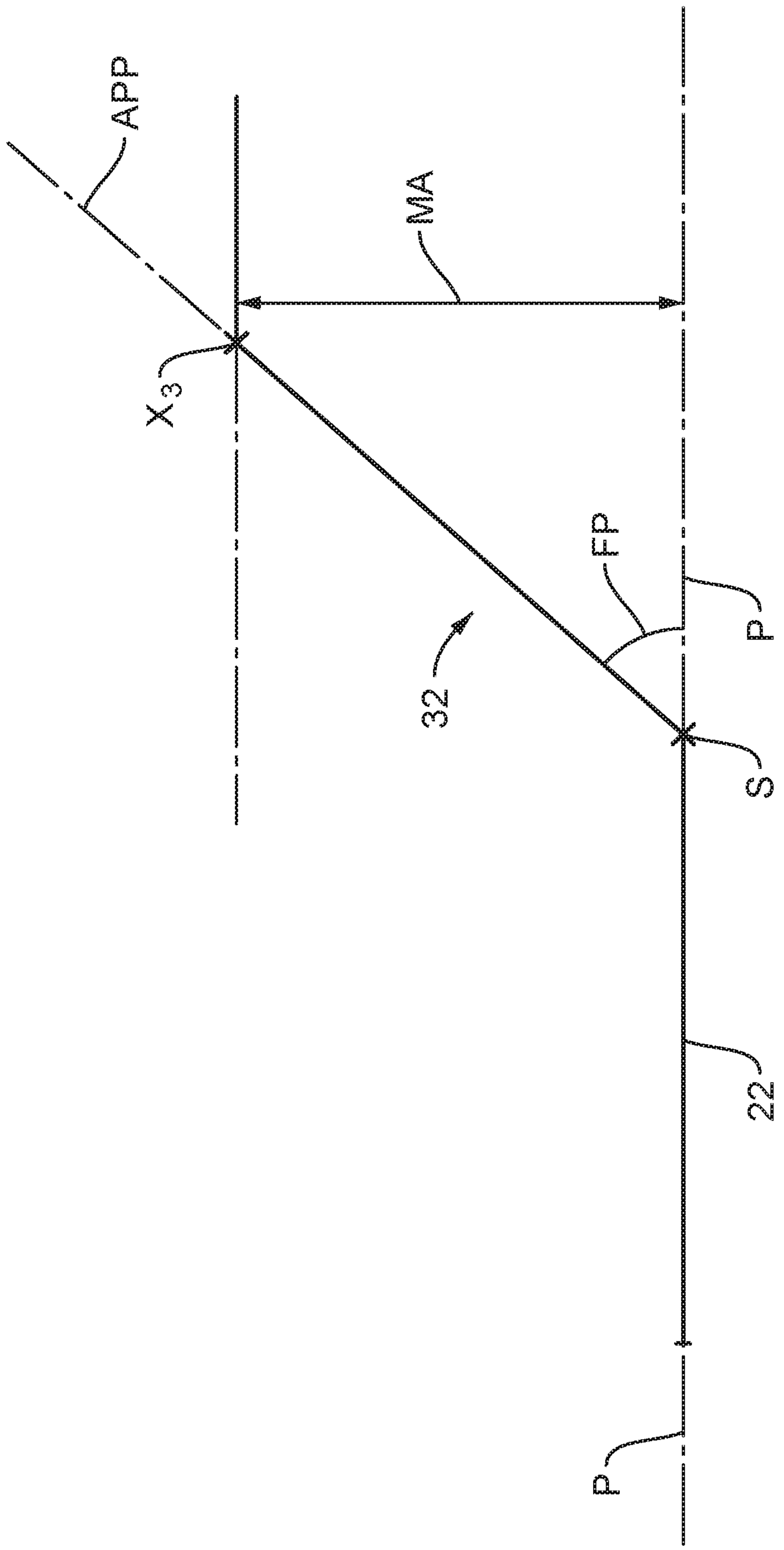
FIG. 4 is a view similar to that of FIG. 3, showing vertical visual approach trajectory parameters used to compute a vertical visual approach trajectory.

The runway 22 extends substantially in a reference plane P, visible in FIG. 4, and having a runway axis substantially corresponding to an extension direction of the runway 22. A runway threshold S, visible in FIGS. 3 and 4, is also associated with the runway 22.

The acquisition module 24 is configured to acquire at least one set among the set of values of lateral visual approach trajectory parameters and the set of values of vertical visual approach trajectory parameters.

Each lateral visual approach trajectory parameter is preferably chosen from the group consisting of: the position of an initial point A of the approach trajectory, also called anchor point; an outbound heading TRK, also called outbound travel; a length L of a segment, preferably rectilinear, of the approach trajectory; a turn radius D of the aircraft 10; and a turning direction, such as to the left or the right, of the aircraft 10 for the visual approach trajectory.

The set of lateral visual approach trajectory parameters then for example comprises the position of the anchor point A, the outbound heading TRK, the length L of the rectilinear segment of the approach trajectory, the turn radius D and the turn direction. The set of lateral visual approach trajectory parameters is preferably made up of said position of the anchor point A, said outbound heading TRK, said length L of the rectilinear segment, said turn radius D and said turn direction.

Each vertical visual approach trajectory parameter is preferably selected from the group consisting of: a minimum altitude MA of an initial point $X_3$ of descent along a final approach axis APP; and an angle FP of the final approach axis APP relative to a reference plane P of the runway 22.

The set of vertical visual approach trajectory parameters then for example comprises the minimum altitude MA of the initial point of descent $X_3$ and the angle FP of the final approach axis APP relative to the reference plane P of the runway 22. The set of vertical visual approach trajectory parameters is preferably made up of said minimum altitude MA of the initial point of descent $X_3$ and said angle FP of the final approach axis APP relative to the reference plane P.

The anchor point A, or initial point of the visual approach trajectory, corresponds to the first point of the visual approach trajectory, that is to say, the point where the flight management system 20 transitions to manual piloting according to a visual approach mode, typically after a managed guiding mode, that is to say, a guiding mode of the aircraft 10 according to a trajectory established from a corresponding flight plan. In other words, from this anchor point A, the flight management system 20 no longer follows the flight plan, the aircraft 10 then being piloted manually in visual approach mode. The value of the position of the anchor point A is for example designated by the user via the designating module 26, as will be described in detail hereinafter in light of FIGS. 5 to 7. In a variant, in particular in the absence of designation by the user, the value of the anchor point A is positioned at a predefined position, such as the position of the missed approach point, also called MAP.

The outbound heading TRK corresponds to a direction to be followed by the aircraft 10 to deviate from an initial straight approach to the runway 22. The outbound heading TRK, also called outbound travel, then corresponds to a heading, expressed for example in degrees, the value of which can be designated by the user via the designating module 26. In a variant, in particular when no designation is done by the user, the value of the outbound heading TRK is positioned at a predefined value, this predefined value by default for example being equal to 45°.

The segment of the approach trajectory forming a lateral visual approach trajectory parameter is typically a rectilinear segment, preferably along the runway 22. In other words, said segment of the approach trajectory is a rectilinear segment substantially parallel to the runway axis, as shown in the example of FIG. 3, where said segment corresponds to the rectilinear segment $[X_1X_2]$ between the first $X_1$ and second $X_2$ characteristic points. The value of the length L of said segment can be designated by the user via the designating module 26. In a variant, in particular when no designation is made by the user, the value of the length L of said segment is positioned at a predefined value, preferably depending on the length of the runway 22, the current speed of the aircraft 10, and the turn radius D of the aircraft 10.

The turn radius D of the aircraft 10, also called final turn radius, or radius of the last turn before landing, corresponds to the radius of a 180° turn with an optimal roll. This turn radius D then has a value greater than or equal to a 180° turn radius with a maximum roll in the flight envelope of the aircraft. The turn radius D typically has a predefined value contained in the database 14, this predefined value depending on a category of the aircraft. As illustrated as an example in table 1 below, comprising five categories of aircraft Cat_A to Cat_E, the category is for example as a function of an approach speed VA at 1000 feet. Each category typically depends on a gauge, or bulk, of the aircraft 10.

In table 1 below, indicated, as an example and by category of aircraft, are predefined default values for the turn radius D of the aircraft 10, the length L of the straight segment of the approach trajectory, and for a maneuvering radius R around the runway 22.

The outbound heading TRK is for example expressed in degrees, the length L of the approach trajectory segment is for example expressed in nautical miles, or Nm, and the turn radius D is for example expressed in nautical miles, or Nm. The minimum altitude Ma is for example expressed in feet, or ft, and the angle Fp of the final approach axis APP relative to the reference plane P is for example expressed in degrees. In addition, the approach speed is for example expressed in knots, or kt, and the radius R for the maneuvering zone is for example expressed in nautical miles, or Nm.

TABLE 1

| Category/ VA (kt) | Cat_A/ 100 | Cat_B/ 135 | Cat_C/ 180 | Cat_D/ 205 | Cat_E/ 240 |
|---|---|---|---|---|---|
| D (Nm) | 0.69 | 1.13 | 1.85 | 2.34 | 3.12 |
| L (Nm) | 0.30 | 0.40 | 0.50 | 0.60 | 0.70 |
| R (Nm) | 1.68 | 2.66 | 4.20 | 5.28 | 6.94 |

In a variant, the value of the turn radius D can be designated by the user via the designating module 26.

The turning direction of the aircraft 10 corresponds to the direction of a first turn of the visual approach trajectory when said first trajectory comprises several successive turns. One skilled in the art will further understand that if the visual approach trajectory comprises a single turn, the direction of said turn will depend directly on the position of the anchor point A, the value of the outbound heading TRK and the position of the runway 22, in particular its runway threshold, and the direction of this turn will then not be a modifiable parameter of the visual approach trajectory.

The minimum altitude MA of the initial point of descent $X_3$ along the final approach axis APP is for example predefined. The value of the minimum altitude MA can for example be designated by the user via the designating module 26. In a variant, in particular when the user does not designate said value, the value of the minimum altitude MA is equal to the minimum decision altitude MDA predefined for the runway 22, this value being contained in the database 14.

The angle PF of the final approach axis APP relative to the reference plane P of the runway 22 corresponds to the final slope of the aircraft 10 approaching the runway 12 along the final approach axis APP and up to the runway threshold S. The value of said angle FP can for example be designated by the user via the designating module 26. In a variant, in particular when the user has not designated said value, the value of said angle FP is equal to a predefined final slope, typically a slope substantially equal to 3°.

The designating module 26 is configured to designate, from an interaction with the user, at least one of the visual approach trajectory parameter values.

The designating module 26 is for example configured to receive a datum entered by the user using a keyboard and/or a mouse, then to designate the value of the trajectory parameter corresponding to the received value, the interaction then being the entry done on the keyboard and/or the mouse.

Figure 5:
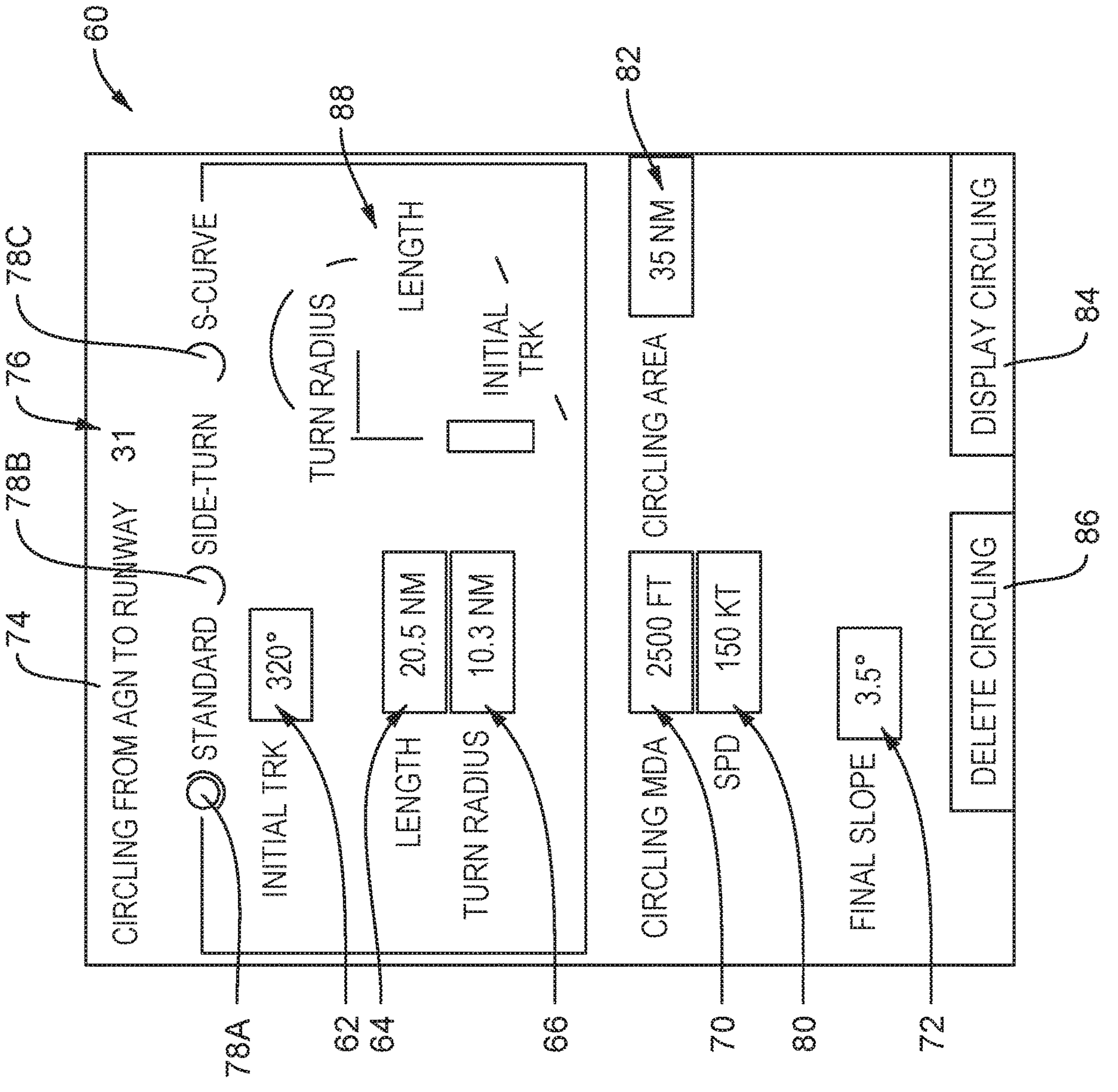
FIG. 5 is a view illustrating a man/machine interface allowing the user, such as the pilot or the copilot of the aircraft, to designate values of certain, or even all, of the visual approach trajectory parameters, for a first type of visual approach trajectory.
Figure 6:
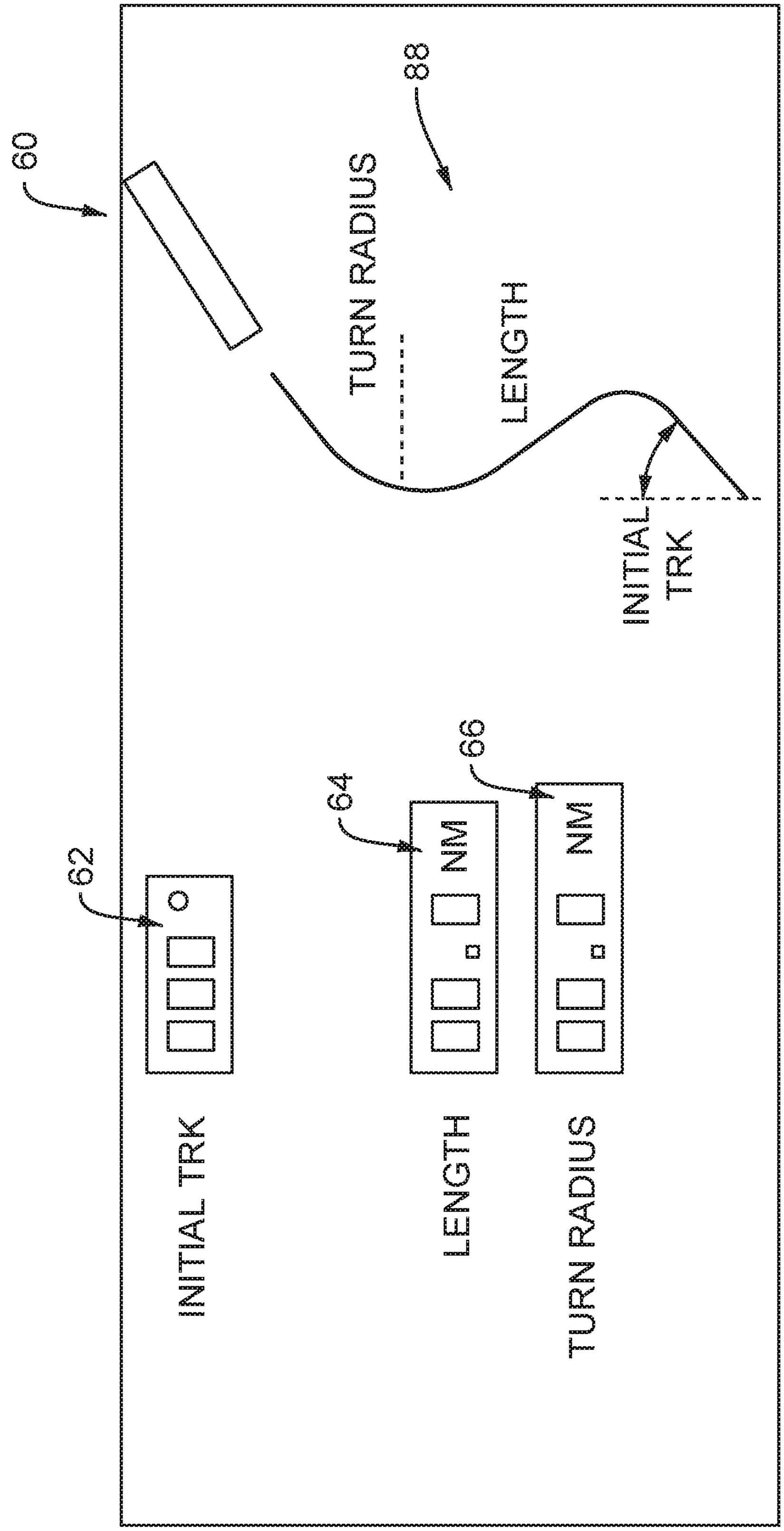
FIG. 6 is a view similar to that of FIG. 5 for a second type of visual approach trajectory, FIG. 6 being a partial view of said man/machine interface.
Figure 7:
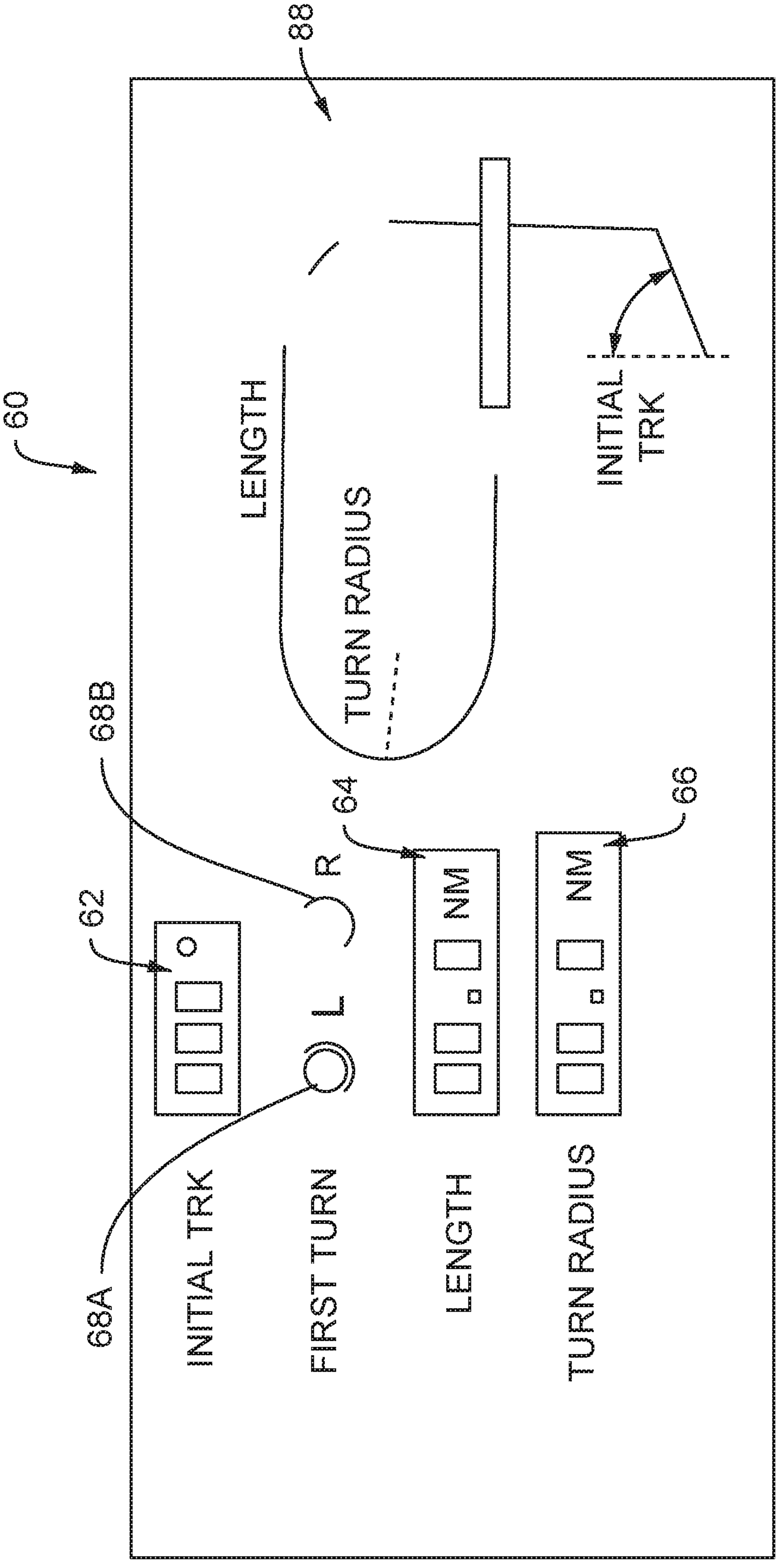
FIG. 7 is a view similar to that of FIG. 6 for a third type of visual approach trajectory.

In a variant or in addition, the interaction by the user is a tactile interaction, for example on the display screen 16 when it is touch-sensitive, and the designating module 26 is then configured to display a man-machine interface 60, like that displayed as an example in FIGS. 5 to 7, then to receive the tactile interaction(s) done by the user on said man/machine interface 60, and then to designate the value of the corresponding trajectory parameter(s), from the received tactile interactions.

One skilled in the art will understand that a value designation refers to the position of the approach trajectory parameter corresponding to said value.

In the example of FIGS. 5 to 7, the man/machine interface 60 then comprises a first entry field 62 for the designation of a desired value of the outbound heading TRK, a second entry field 64 for the designation of a desired value of the length L of the segment of the approach trajectory, a third entry field 66 for the designation of a desired value of the turn radius D.

As an optional addition, the man/machine interface 60 comprises two chips 68A, 68B for designating the desired turning direction of the aircraft 10, a first chip 68A corresponding to a left turn and a second chip 68B corresponding to a right turn, as shown in FIG. 7.

As another optional addition, the man/machine interface 60 comprises a fourth entry field 70 for designating the minimum altitude MA, and a fifth entry field 72 for designating the angle FP of the final approach axis APP relative to the reference plane P of the runway 22, which are visible in FIG. 5.

In the example of FIG. 5, the man/machine interface 60 also comprises a first indicator field 74 to indicate the anchor point A taken into account and a second indicator field 76 to indicate an identifier of the runway 22.

As another optional addition, the man/machine interface 60 comprises, in the example of FIG. 5, chips 78A, 78B, 78C for selecting the type of visual approach trajectory, namely a first selection chip 78A for selecting a first type T1 of visual approach trajectory, a second selection chip 78B for selecting a second type T2 of visual approach trajectory and a third selection chip 78C for selecting a third type T3 of visual approach trajectory. The first, second and third types T1, T2, T3 of visual approach trajectory are described as examples in more detail hereinafter.

As another optional addition, the man/machine interface 60 comprises a sixth entry field 80 for entering an approach speed value VA and a seventh entry field 82 for entering the maneuvering radius R around the runway 22.

In the example of FIG. 5, the man/machine interface 60 also comprises a validation button 84 in order to validate the designated visual approach trajectory parameter values, and then trigger the computation of at least one trajectory among the lateral visual approach trajectory 30 and the vertical visual approach trajectory 32, as well as a cancel button 86 in order to cancel a designation previously done of the visual approach trajectory parameters.

Also as an optional addition, the man/machine interface 60 further comprises a schematic profile 88 symbolizing the type of visual approach trajectory among the first, second and third types T1, T2, T3 of visual approach trajectory, and further illustrating the outbound heading TRK, the length L of the segment of the approach trajectory, and the turning radius D.

In FIGS. 5 to 7, the views of the man/machine interface 60 of the electronic flight management system according to the invention illustrate actual views that comprise indications in English, as is the case in the aeronautic field. A translation into French of the relevant indications is provided in the description that follows if necessary.

The computing module 28 is configured to compute at least one trajectory among the lateral visual approach trajectory 30 and the vertical visual approach trajectory 32.

The vertical visual approach trajectory corresponds to a vertical profile of the visual approach trajectory, that is to say, a projection of the visual approach trajectory in a vertical plane containing a vertical reference axis and a horizontal reference axis. The vertical reference axis is defined along the axis of baro-corrected altitudes, corresponding to the QNH aeronautic code.

The lateral visual approach trajectory corresponds to a horizontal profile of the visual approach trajectory, that is to say, a projection of the visual approach trajectory of the aircraft 10 in a horizontal plane perpendicular to the vertical plane.

In order to compute the lateral visual approach trajectory 30, the computing module 28 is configured to determine a separation distance E relative to the runway 22, the separation distance E corresponding to the distance necessary to allow the aircraft 10 to perform its last turn, and for example being equal to twice the turn radius D, that is to say, the diameter of said turn.

The computing module 28 is next configured to determine the position of the first characteristic point $X_1$ corresponding to the intersection between a first line Δ1 passing through the anchor point A and following the outbound heading TRK and a second line Δ2 parallel to the runway 22, that is to say, its extension direction, and distant from the separation distance E of the runway 22, as shown in FIG. 3.

The computing module 28 is next configured to compute the coordinates of the second characteristic point $X_2$ from the distance L of the trajectory segment, the second characteristic point $X_2$ corresponding to a point distant from the length L relative to the first characteristic point $X_1$, along the direction of the second line $\Delta_2$ and toward the second turn before landing on the runway 22.

In the example of FIG. 3, the lateral visual approach trajectory 30 is then formed by the rectilinear segment $[AX_1]$ between the anchor point A and the first characteristic point $X_1$, this segment being along the outbound heading TRK, followed by a straight segment $[X_1X_2]$ with length L and parallel to the runway 22, followed by a half-circle with radius D between the second characteristic point $X_2$ and the runway axis, this half-circle corresponding to the last turn performed by the aircraft 10, and lastly followed by a straight segment, along the runway axis, between said half-circle and the runway threshold S.

In order to compute the vertical visual approach trajectory 32, the computing module 28 is configured to determine the final approach axis APP from the runway threshold S and as a function of the angle FP between the final approach axis APP and the reference plane P of the runway 22.

The computing module 28 is next configured to compute the coordinates of the initial point of descent $X_3$, also called third characteristic point, corresponding to the intersection between the final approach axis APP and a horizontal plane positioned at the minimum altitude MA.

In the example of FIG. 4, the vertical visual approach trajectory 32 is then formed by a substantially horizontal straight segment $[AX_3]$ between the anchor point A and the third characteristic point $X_3$ at the minimum altitude MA, followed by a segment $[X_3S]$ corresponding to the final descent of the aircraft 10 along the final slope FP between the third characteristic point $X_3$ and the runway threshold S.

One skilled in the art will understand that the lateral visual approach trajectory 30, and respectively the vertical visual approach trajectory 32, are shown in thick lines in FIG. 3, and respectively in FIG. 4.

The generating module 34 is configured to generate the visual approach trajectory to the runway 22 from the lateral visual approach trajectory 30 and/or the vertical visual approach trajectory 32.

When the computing module 28 has computed both the lateral visual approach trajectory 30 and the vertical visual approach trajectory 32, the generating module 34 is configured to generate the visual approach trajectory by concatenation, or by combination, of the lateral visual approach trajectory 30 and the vertical visual approach trajectory 32.

In a variant, when the computing module 28 has computed only the lateral visual approach trajectory 30, the generating module 34 is configured to generate the visual approach trajectory from the computed trajectory alone, that is to say, from the lateral visual approach trajectory 30.

The display module 36 is configured to display, on the display screen 16, the visual approach trajectory generated by the generating module 34.

The display module 36 is preferably further configured to display a symbol representative of the position of the aircraft 10 relative to the visual approach trajectory. The representative symbol is for example in the form of an airplane or helicopter and is displayed on the display screen 16 in the current position of the aircraft 10, superimposed relative to the displayed visual approach trajectory. The user, such as the pilot or the copilot of the aircraft 10, can then easily see where the aircraft 10 is located relative to the visual approach trajectory.

As an optional addition, the transmission module 38 is configured to transmit, to a respective avionic system 12, in particular to the electronic automatic pilot system, the instructions making it possible to follow the visual approach trajectory generated by the generating module 34. This transmission of said following instructions to the electronic automatic pilot system then allows an automatic pilot of the aircraft 10 following the visual approach trajectory previously generated by the generating module 34, which further facilitates the task of the user.

As another optional addition, the selection module 40 is configured to select a respective type among the group of visual approach trajectory types T1, T2, T3, each visual approach trajectory type T1, T2, T3 corresponding to a respective predefined form of the visual approach trajectory. According to this optional addition, the acquisition module 24 is then configured to acquire the or each set of trajectory parameter values as a function of the type selected by the selection module 40.

The group of types T1, T2, T3 for example comprises the first type T1 corresponding to a visual approach trajectory comprising a deviation according to the outbound heading TRK, followed by a segment substantially parallel to the runway 22 and a turn at substantially 180°; the second T2 corresponding to a visual approach trajectory comprising a deviation according to the outbound heading TRK followed by a segment substantially perpendicular to the runway 22 and a turn at substantially 90°; and the third type T3 corresponding to a visual approach trajectory comprising a deviation according to the outbound heading TRK followed by a first turn, to the left or the right, substantially between 90° and 180°, a segment substantially parallel to the runway 22 and a final turn substantially at 180°.

Figure 2:
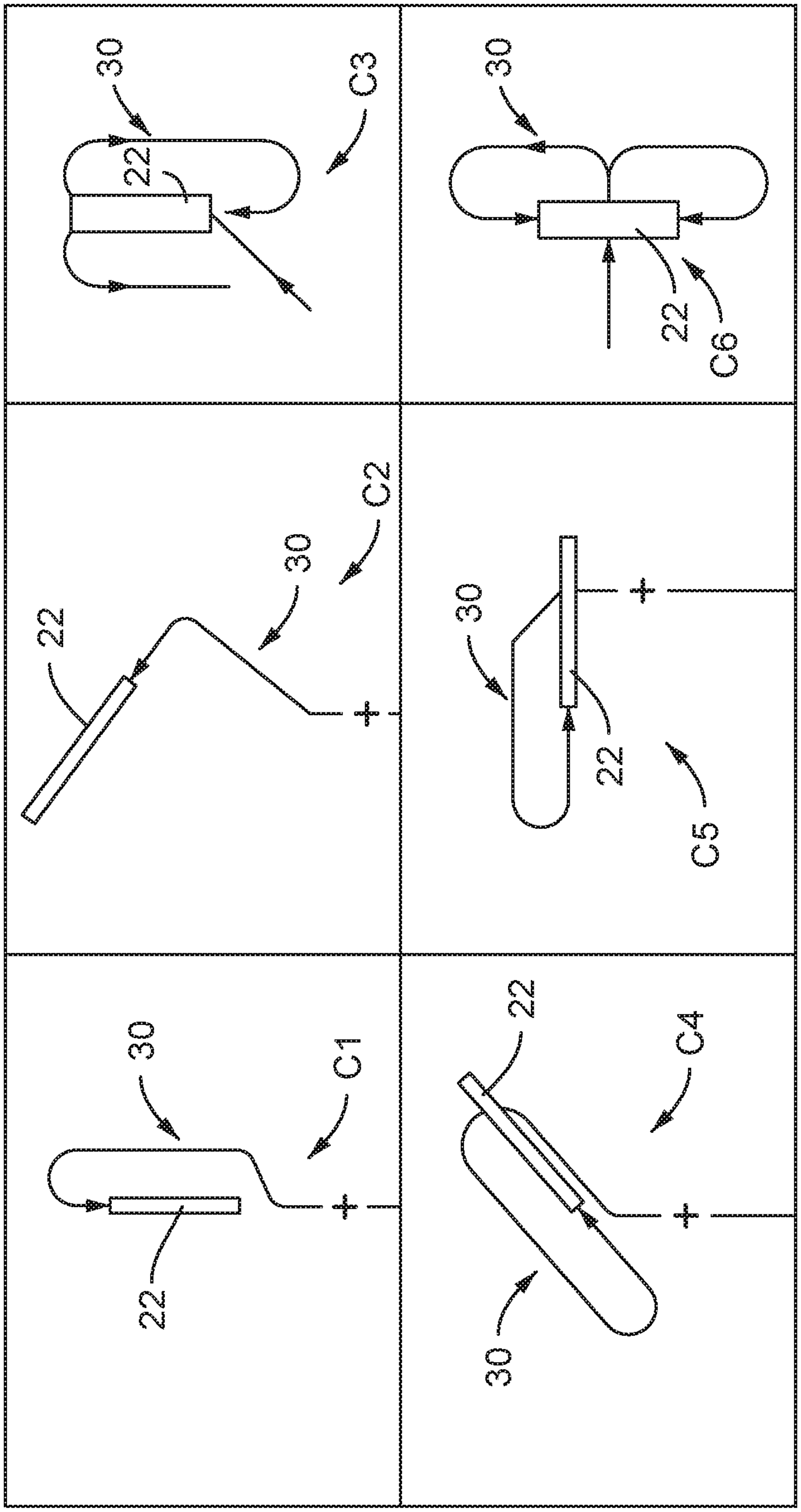
FIG. 2 is a schematic view illustrating different types of visual approach trajectory.

In order to illustrate these first, second and third types T1, T2, T3, FIG. 2 shows six conventional visual approach trajectories for circling, denoted C1 to C6. In the example of FIG. 2, the first type T1 then corresponds to the two trajectories C1 and C5, the second type T2 corresponds to the trajectory C2, and lastly the third type T3 corresponds to the three trajectories C3, C4 and C6.

The selection module 40 is for example configured to select the type among the group of types T1, T2, T3 from an interaction by the user, for example using selection chips 78A, 78B, 78C visible in FIG. 5.

As another optional addition, the determining module 42 is configured to determine the maneuvering zone around the runway 22, for example from the radius R previously described. According to this optional addition, the display module 36 is then configured to further display the maneuvering zone thus determined on the display screen 16.

The determining module 42 is for example configured to determine the maneuvering zone by overlap of several discs, or disc portions, each with radius R and centered on different ends of the runway 22. The set of points located in the horizontal plane of the lateral visual approach trajectory 30 must be located inside the maneuvering zone, and in other words at a distance from the runway 22 smaller than the radius R.

As another optional addition, the estimating module 44 is configured to estimate at least one respective aeronautical variable at one or several successive points of the visual approach trajectory.

Each aeronautical variable estimated by the estimating module 44 at a respective point of the visual approach trajectory is for example selected from the group consisting of: a distance between said respective point of the visual approach trajectory (for which the estimate is done) and another point of the visual approach trajectory, a remaining quantity of fuel, a passage date and a speed of the aircraft 10.

The estimating module 44 is for example configured to estimate said aeronautical variable(s) from estimating functions known in themselves and integrated into the flight management system 20.

The operation of the electronic flight management system 20 according to the invention will now be described in light of FIG. 8, showing a flowchart of the method according to the invention, for managing the flight of the aircraft 10.

During an optional initial step 100, from an interaction by the user, such as the pilot or the copilot, the flight management system 20 selects, via its selection module 40, a respective type among the group of visual approach trajectory types T1, T2, T3, each type T1, T2, T3 corresponding to a predefined respective form of the visual approach trajectory.

The flight management system 20 designates, during a following step 110 and via its designating module 26, at least one of the visual approach trajectory parameter values from an interaction, for example tactile, by the user, such as the pilot or the copilot of the aircraft 10.

During a following step 120, the flight management system 20 acquires, via its acquisition module 24, at least one set among the set of lateral visual approach trajectory parameter values and the set of vertical visual approach trajectory parameter values.

During this acquisition step 120, the acquisition module 24 preferably acquires both the set of lateral trajectory parameter values and the set of vertical trajectory parameter values.

During this acquisition step 120, the acquisition module 24 acquires the parameter value(s) previously designated via the designating module 26 during the preceding designating step 110, as well as the predefined values for the other visual approach trajectory parameters for which a value was not designated during the designating step 110.

The flight management system 20 next computes, during the following step 130 and via its computing module 28, at least one trajectory among the lateral visual approach trajectory 30 and the vertical visual approach trajectory 32. In particular, the computing module 28 computes the lateral visual approach trajectory 30 when the acquired set (during the acquisition step 120) is the set of lateral trajectory parameter values, the lateral visual approach trajectory 30 indeed being computed from the values of said lateral trajectory parameters; and in a corollary manner, the computing module 28 computes the vertical visual approach trajectory 32 when the acquired set is the set of vertical trajectory parameters, the vertical visual approach trajectory 32 being computed from the values of said vertical trajectory parameters. During the computing step 130, the computing module 28 preferably computes both the lateral visual approach trajectory 30 and the vertical visual approach trajectory 32.

The flight management system 20 then generates, during the following step 140 and via its generating module 34, the visual approach trajectory to the runway 22, from the lateral visual approach trajectory 30 and/or the vertical visual approach trajectory 32, computed during the preceding computing step 130.

During an optional following step 150, the flight management system 20 further estimates, via its estimating module 44, one or several aeronautical properties at one or several successive points of the visual approach trajectory generated during step 140. The estimated aeronautical variable(s) are for example the distance between said considered point of the visual approach trajectory and another point of the visual approach trajectory, preferably the distance between said considered point and the next point of the visual approach trajectory, as well as the remaining quantity of fuel, the passage date and the speed of the aircraft 10 at said considered point of the visual approach trajectory. Said estimated aeronautical variable(s) then make it possible to help the user still more effectively, to perform more precise and more predictable tracking of the visual approach trajectory.

During a following step 160 that is also optional, the flight management system 20 determines, via its determining module 42, the maneuvering zone around the runway 22.

Lastly, during a display step 170 that is also optional, the flight management system 20 displays, via its display module 36, the visual approach trajectory generated during step 140, as well as, by way of optional addition, the aircraft symbol representing the current position of the aircraft, so as to allow the user to know where the aircraft 10 is located relative to the generated visual approach trajectory.

During this display step 170, the display module 36 also displays the maneuvering zone when it has been determined during step 160, and/or any aeronautical properties estimated during the estimating step 150.

Optionally, the flight management system 20 transmits, during a step 180 and via its transmission module 38, the instructions to follow the visual approach trajectory generated during step 140 to a respective avionic system 12, such as the automatic pilot system.

One skilled in the art will then understand that the flight management system 20 is able to perform, at the end of the generating step 140, or even optionally the estimating step 150 and/or the determining step 160, both the display step 170 and the transmission step 180, or alternatively one or the other of them.

Thus, the flight management system 20 according to the invention makes it possible to generate the visual approach trajectory automatically, whether in a visual maneuver with prescribed track VPT or circling MVL, and then makes it possible to follow the trajectory of the aircraft 10 with visual approach by the user, which is much more precise and predictable.

The flight management system 20 further makes it possible to limit the quantity of data that must be stored in the database 14, the visual approach trajectory then no longer being stored in predefined form in the database 14, but computed by the computing module 28.

The flight management system 20 also makes it possible to further improve the piloting aid with the display of the generated visual approach trajectory and any aeronautical properties estimated via the display module 36, and/or the ability to connect the automatic pilot to the visual approach trajectory generated via the transmission module 38.

The flight management system 20 also makes it possible to improve the downgraded management, where it is necessary to interrupt the visual approach procedure, for example in case of lost visibility, and to perform a go-around maneuver. Indeed, the coexistence of the visual approach trajectory generated by the generating module 34 with the standard approach, for which a go-around procedure is defined, allows the user to benefit from the display both of the co-around procedure and the visual approach trajectory recomputed after this co-around procedure.

One can thus see that the flight management system 20 according to the invention offers the user, such as the pilot or the copilot of the aircraft 10, more precise tracking of the trajectory of the aircraft 10 by visual approach.

The invention claimed is:

1. A method for managing the flight of an aircraft in a visual approach phase to a runway, the method being implemented by an electronic flight management system and comprising:

acquiring at least one set among a set of values of lateral visual approach trajectory parameters and a set of values of vertical visual approach trajectory parameters, at least one of said values of visual approach trajectory parameters being able to be designated by a user, computing at least one trajectory among a lateral visual approach trajectory from the values of said lateral visual approach trajectory parameters and a vertical visual approach trajectory from the values of said vertical visual approach trajectory parameters, and generating a visual approach trajectory to the runway from the lateral visual approach trajectory or the vertical visual approach trajectory, wherein each lateral visual approach trajectory parameter is chosen from among the group consisting of: the position of an initial point of the approach trajectory, an outbound heading, a length of a segment of the approach trajectory, a turn radius of the aircraft and a turning direction of the aircraft; and wherein each vertical visual approach trajectory parameter is selected from among the group consisting of: a minimum altitude of an initial point of descent along a final approach axis and an angle of the final approach axis relative to a reference plane of the runway.

2. The method according to claim 1, wherein the method further comprises displaying, on a display screen, the visual approach trajectory.

3. The method according to claim 2, wherein the displaying further comprises the display of a symbol representative of the position of the aircraft relative to the visual approach trajectory.

4. The method according to claim 1, wherein the method further comprises transmitting instructions for following the visual approach trajectory to an electronic automatic pilot system.

5. The method according to claim 1, wherein the method further comprises, prior to the acquiring, selecting a type among a group of types of visual approach trajectory, each type of visual approach trajectory corresponding to a respective predefined form of the visual approach trajectory, and during the acquiring, the or each set of values of visual approach trajectory parameters then depending on the selected type.

6. The method according to claim 5, wherein the group of types comprises:

a first type corresponding to a visual approach trajectory comprising a deviation by an outbound heading followed by a segment substantially parallel to the runway and a turn at substantially 180°;

a second type corresponding to a visual approach trajectory comprising a deviation by an outbound heading followed by a segment substantially perpendicular to the runway and a turn at substantially 90°; and a third type corresponding to a visual approach trajectory comprising a deviation by an outbound heading followed by a turn substantially between 90° and 180°, a segment substantially parallel to the runway and a turn at substantially 180°.

7. The method according to claim 1, wherein the method further comprises determining a maneuvering zone around the runway.

8. The method according to claim 1, wherein the method further comprises estimating at least one aeronautical variable at least at one point of the visual approach trajectory.

9. The method according to claim 8, wherein each aeronautical variable at a respective point of the visual approach trajectory is chosen from among the group consisting of: a distance between said respective point of the visual approach trajectory and another point of the visual approach trajectory, a remaining quantity of fuel, a passage date and a speed of the aircraft.

10. A non-transitory computer-readable medium including a computer program comprising software instructions which, when executed by a computer, carry out a method comprising:

acquiring at least one set among a set of values of lateral visual approach trajectory parameters and a set of values of vertical visual approach trajectory parameters, at least one of said values of visual approach trajectory parameters being able to be designated by a user, computing at least one trajectory among a lateral visual approach trajectory from the values of said lateral visual approach trajectory parameters and a vertical visual approach trajectory from the values of said vertical visual approach trajectory parameters, and generating a visual approach trajectory to the runway from the lateral visual approach trajectory or the vertical visual approach trajectory, wherein each lateral visual approach trajectory parameter is chosen from among the group consisting of: the position of an initial point of the approach trajectory, an outbound heading, a length of a segment of the approach trajectory, a turn radius of the aircraft and a turning direction of the aircraft; and wherein each vertical visual approach trajectory parameter is selected from among the group consisting of: a minimum altitude of an initial point of descent along a final approach axis and an angle of the final approach axis relative to a reference plane of the runway.

11. An electronic flight management system, the system being configured to manage the flight of an aircraft in the visual approach phase to a runway, and comprising:

an acquisition module configured to acquire at least one set among a set of values of lateral visual approach trajectory parameters and a set of values of vertical visual approach trajectory parameters, a designating module configured to designate, from an interaction with a user, at least one of said values of visual approach trajectory parameters, a computing module configured to compute at least one trajectory among a lateral visual approach trajectory from the values of said lateral visual approach trajectory parameters and a vertical visual approach trajectory from the values of said vertical visual approach trajectory parameters, and a generating module configured to generate a visual approach trajectory to the runway from the lateral visual approach trajectory or the vertical visual approach trajectory, wherein each lateral visual approach trajectory parameter is chosen from among the group consisting of: the position of an initial point of the approach trajectory, an outbound heading, a length of a segment of the approach trajectory, a turn radius of the aircraft and a turning direction of the aircraft; and wherein each vertical visual approach trajectory parameter is selected from among the group consisting of: a minimum altitude of an initial point of descent along a final approach axis and an angle of the final approach axis relative to a reference plane of the runway.

12. The system according to claim 11, wherein the system further comprises a display module configured to display, on a display screen, the visual approach trajectory.

13. The system according to claim 12, wherein the display module is further configured to display a symbol representative of the position of the aircraft relative to the visual approach trajectory.

* * * * *